United States Patent [19]

Klas et al.

[11] 4,426,831
[45] Jan. 24, 1984

[54] MOWER BLADE

[75] Inventors: Kenneth H. Klas; Norbert J. Ansay, both of Port Washington, Wis.

[73] Assignee: Simplicity Manufacturing, Inc., Port Washington, Wis.

[21] Appl. No.: 499,424

[22] Filed: Jun. 6, 1983

Related U.S. Application Data

[63] Continuation of Ser. No. 355,354, Mar. 8, 1982, which is a continuation of Ser. No. 220,000, Dec. 23, 1980, abandoned.

[51] Int. Cl.³ ............................................ A01D 55/18
[52] U.S. Cl. ........................................ 56/295; 56/17.5
[58] Field of Search ............... 56/295, 13.4, DIG. 17, 56/DIG. 20, 17.5; 30/347, 276

[56] References Cited

U.S. PATENT DOCUMENTS

| | | | |
|---|---|---|---|
| 2,799,985 | 7/1957 | Rosenburg | 56/295 |
| 3,183,655 | 5/1965 | Dunlap et al. | 56/295 |
| 3,185,655 | 5/1965 | Dunlap et al. | 56/295 |
| 3,315,451 | 4/1967 | Hill | 56/295 |
| 3,788,050 | 1/1974 | Houst et al. | 56/295 |
| 3,998,037 | 12/1976 | Deans et al. | 56/295 |
| 4,214,426 | 7/1980 | Lindblad | 56/295 |

OTHER PUBLICATIONS

Briggs and Stratton Corp., "Development of Quiet Blades", 9-15-1958, Figure 25, p. 32.

Primary Examiner—Gene Mancene
Assistant Examiner—John Weiss
Attorney, Agent, or Firm—James E. Nilles

[57] ABSTRACT

An elongated blade (21) for a rotary mower is fabricated from a nonrectangular blank (9) so that the lift portions (33, 34) formed on the trailing parts of the blade have radially outer peripheries (41, 42) which lie substantially on a circle (d) generated by the radially outer tips (46, 47) of the leading cutting edges (28, 29). This produces a blade with improved grass bagging characteristics due to greatly improved discharge of air entrained clippings.

3 Claims, 5 Drawing Figures

MOWER BLADE

This application is a continuation of application Ser. No. 355,354, filed Mar. 8, 1982, which in turn is a continuation application of Ser. No. 220,000, filed Dec. 23, 1980 now abandoned.

BACKGROUND OF THE INVENTION

1. Technical Field

This invention relates to a cutting blade for a rotary lawn mower wherein the elongated blade rotates about a vertical axis at a midpoint of its longitudinal and transverse dimensions.

2. Prior Art

A wide variety of cutting blades have been suggested for rotary mowers. In nonmulching mowers, blades have been designed to sever the grass and to aid in discharging the cut grass through a discharge opening in the blade housing or through a chute to a side or rear mounted catcher. Heretofore, others have provided upwardly angled lift portions at the outer ends of the blade to lift the grass clippings and provide air movement to carry the air entrained grass clippings to the discharge portion of the mower blade housing. Prior art patent U.S. Pat. No. 2,836,029 shows a blade made from a generally rectangular shaped blank with cutting edges at the leading portions near the radially outer ends of the blade and inclined lift portions in trailing relation to the cutting edges. In U.S. Pat. No. 3,315,451 a rotary blade is shown and described as having cutting edges which, along their lengths, extend obliquely radially outwardly and rearwardly relative to the direction of blade rotation, thus increasing the radially outward force exerted on the grass during a cutting operation. The blank from which the blade of U.S. Pat. No. 3,315,451 is formed is eight sided in its top view and thus it is more expensive to form as compared to a parallelogram shaped blade blank. In this last mentioned patent disclosure, it will also be noted that the edges at the opposite ends of the blade extend at right angles to the longitudinal axis of the blade and the lift portions are bent upwardly along lines parallel to the longitudinal axis of the blade. This results in the radially outer tips of the cutting edges lying a substantial distance inwardly from the circle generated by the radially outer trailing tip of the lift portions of the blade. In using this prior art mower, a substantial width of the outer tip of the lift portions is forced through grass not severed by the leading cutting edge.

SUMMARY OF THE INVENTION

This invention provides a blade for a rotary mower of generally flat elongated configuration having a pair of diametrically opposite leading cutting edges extending from the radially outer blade extremities inwardly a predetermined distance and including a pair of trailing lift portions inclining upwardly from a line extending from points intermediate the leading and trailing corners of the radially outer ends of the blade to points on the trailing edge spaced inwardly a substantial distance from the radially outer ends. The radially outer ends of the blade are disposed at an acute angle to the longitudinal axis of said blade and the radially outer tips of the cutting edges and the radially outer tip of the trailing edge of said lift portions lie in substantially the same circle whose center is on the center axis of the blade, about which the latter rotates during a cutting operation.

The principal object of this invention is to provide a mower blade having superior grass clipping discharge characteristics which make the blade ideal for use in a rotary mower such as a riding mower having a rear mounted grass receptacle.

A more specific but very important object of this invention is to provide a lawn mower blade that can be formed from a simple and inexpensive flat blank that has longitudinal edges which are straight and parallel to one another along the full length of the blank and has straight edges at its opposite ends, said blade, as formed, being bent to provide an upwardly and rearwardly inclined lift portion behind each of a pair of cutting edges on the blade, and the straight end edges of the blank being so disposed in relation to the longitudinal edges that each of said lift portions of the formed blade has its terminal edge at substantially the same distance from the rotational axis of the blade as the terminal end of its forwardly adjacent cutting edge, with the result that the lift portions of the blade do not waste power by engaging uncut grass, but each can nevertheless impart lift to grass clippings that have been cut at every point along the length of its forwardly adjacent cutting edge.

BRIEF DESCRIPTION OF THE DRAWINGS

One embodiment of the invention is shown in the drawings in which.

DETAILED DESCRIPTION OF THE DRAWINGS

Figure 1:
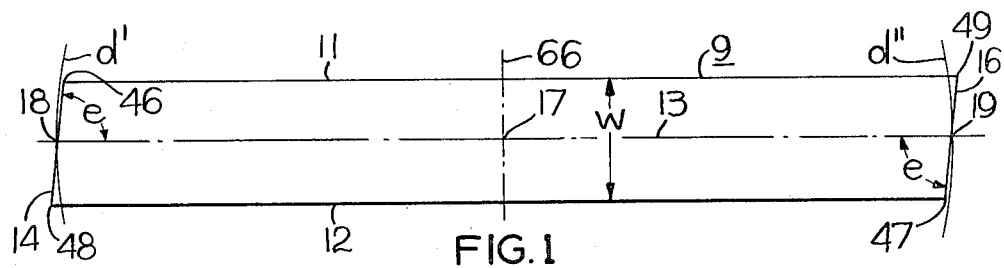
FIG. 1 is a top view of a blade blank from which the blade is manufactured.
Figure 2:
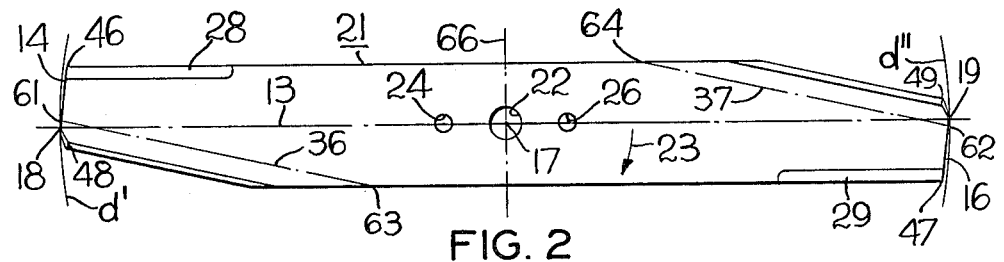
FIG. 2 is a top view of a blade made from the blank of FIG. 1.
Figure 3:
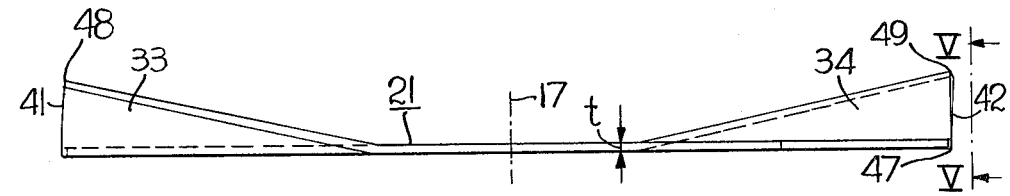
FIG. 3 is a side view of the blade shown in FIG. 2.
Figure 4:
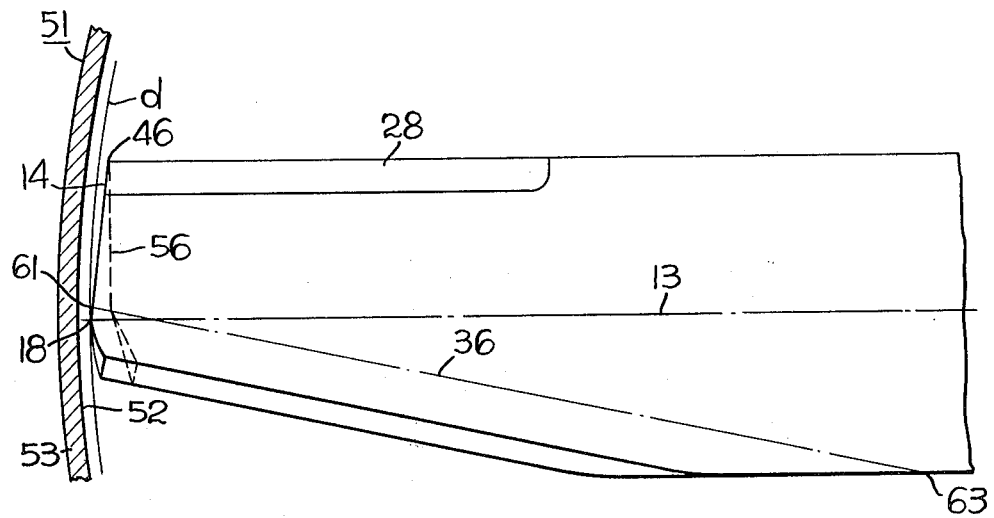
FIG. 4 is an enlarged top view of one end of the blade shown in FIGS. 2 and 3.

FIG. 1 illustrates a blade blank 9 which has been cut from a flat steel sheet having a predetermined uniform width w and uniform thickness t (as shown in FIG. 3). The edges 11, 12 defining the width of the blank 9 are parallel and equal distances from the longitudinal axis 13 of the blank. The edges 14, 16 at the longitudinally opposite ends of the blade blank 9 are parallel to one another and are disposed at an angle e, of about 84.3 degrees to the longitudinal axis 13. Thus, the side edges 11, 12 and end edges 14, 16 define a non-rectangular parallelogram. The angle of the edges 14, 16 is chosen so arcs d', d" of a circle d, whose center is on the vertical center axis 17 of the blank 9, coincide with the edges at the junction points 18, 19 of the longitudinal axis 13 and the edges 14, 16 and pass closely adjacent to, but radially outside of, one set of opposite corners 46, 47 of the end of the blade blank 9 and radially inside of the other set of opposite corners 48, 49 of the blade blank 9. The points 18, 19 are near the end portions of the blade blank 9 where it is bent upwardly to form lift portions.

Figure 5:
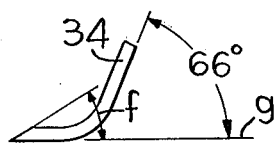
FIG. 5 is a view taken on the line V—V in FIG. 3.

Referring to FIGS. 2–5, a rotary mower blade 21 has been made of the blank 9 by the following steps. A vertical, center hole 22 is drilled on the center vertical axis 17 which is the axis about which the blade rotates in a clockwise direction, as indicated by arrow 23, during a grass cutting operation. A pair of mounting holes 24, 26 are also drilled vertically through the blade 21 to facilitate attachment of the blade to a spindle mounting adapter. Cutting edges 28, 29 are formed on the leading edges of the blade as by grinding to form cutting edge surfaces with rearward inclination at a 30 degree acute angle f to the horizontal plane g (as shown in FIG. 5). Lift portions 33, 34 are formed at an angle of approximately 66 degrees to the horizontal g in trailing relation to the leading cutting edges 28, 29 by bending triangular portions of the blade along lines 36, 37 which are in radially outwardly converging relation to the cutting edges 28, 29, respectively, and to the longitudinal axis 13 of the blade. The diagonal bend lines 36, 37 are parallel to one another and extend from points 61, 62 near points 18, 19 on the blade ends to points 63, 64 on the trailing edges of the blade. The points 63, 64 are each spaced from the transverse axis 66 of the blade 21 a distance greater than one-fourth of and less than one-third of the radius of circle d. As the rearwardly inclined lift portions 33, 34 are formed, the acute angle corners 48, 49 of the blade blank 9 will move radially inwardly so the radially outer extremities or edges 41, 42 of the lift portions 33, 34 will lie substantially in the arcs d', d''.

The arcs d', d'' are contiguous the points 18, 19, respectively, and the radially outer edges 41, 42 of the lift portions 33, 34 and the cutting edges 28, 29 do not extend beyond the arcs d', d''. As illustrated, the outer tips 46, 47 of the cutting edges 28, 29 are slightly radially inwardly from the arcs d', d'' but are closely adjacent thereto. By way of example, an 18.5 inch long blade which is 2.5 inch wide (w) and 0.16 inch thick (t) has its radially outer edges 14, 16 at an angle e of 84.3 degrees to the longitudinal axis 13. The lift portions 33, 34 extend forwardly relative to the longitudinal axis 13 from their radially inner ends to their radially outer ends adjacent the arcs d', d''. This reduces the tendency of the blade to centrifugally sling the clippings outwardly against the surface 52 of the wall 53 of the mower blade housing 51.

OPERATION

During the cutting operation, the blade is rotated in a clockwise direction as viewed from the top and the cutting edges 28, 29 sever the blades of grass. The severed grass clippings move up the cutting edge ramps and back against the lift portions 33, 34 which impart an additional upward movement thereto. At the same time, the lift portions are acting as a fan to develop a torus of air wherein clippings are entrained and which discharges from the blade housing 51 at an appropriate opening, not shown. The use of a nonrectangular blade blank 9 permits the radially outer ends of the lift portions 33, 34 formed from the blank to be closer to inner surface 52 of the vertical wall 53 of the housing 51 than would be the case if the blank were a rectangle in which event it would terminate at the dash line 56 shown in FIG. 4. The extension of the lift portions 33, 34 radially outward as illustrated, greatly reduces the amount of grass clippings passing between the radially outer edges of the blade and the housing wall 52, improves the efficiency of the air movement by the lift portions and markedly improves discharge of grass clippings to a receptacle. This improved blade is ideally suited for use in a mower requiring flow of air entrained clippings a considerable distance to a receptacle such as in a riding mower with a rear grass catcher.

The embodiments of an invention in which an exclusive property or privilege is claimed are defined as follows:

1. An elongated mower blade formed from a substantially flat blank having top and bottom surfaces, parallel longitudinal edges, and opposite end edges, said blade being edgewise rotatable in one direction inside an arcuate mower housing skirt about an axis concentric to the skirt arc that extends through the center of the blade, each of said longitudinal edges thus providing a front edge for one half of the blade that terminates at one of said end edges and a rear edge for the other half of the blade that terminates at the other of said end edges, and each front edge being sharp through a distance inwardly along it from its terminal end edge to provide a cutting edge, said mower blade being characterized by:

A. an upwardly and rearwardly inclined lift portion behind each cutting edge, each said lift portion being defined by a bend that extends substantially along a line
      (1) which is oblique to a rear edge,
      (2) intersects said rear edge at no less than said distance inwardly along it from its terminal end edge, and
      (3) intersects said terminal end edge intermediate said front and rear edges; and B. the blade being formed from a blank wherein each of said end edges is straight and extends at a rearwardly and outwardly inclined obtuse angle to its adjacent cutting edge such that the orbits of the terminal edge of each lift portion of the blade and of the terminal end of the cutting edge are substantially equidistant from the skirt.

2. The mower blade of claim 1 wherein each of said end edges on the blank extends rearwardly at an obtuse angle to the cutting edge that is substantially in the range of 94 to 97 degrees.

3. The mower blade of claim 1 wherein each of said cutting edges is defined by a rearwardly and upwardly inclined surface on the blade to provide a ramp whereby an initial lift is imparted to grass clippings severed by the cutting edge.

* * * * *